United States Patent

[11] 3,552,297

| [72] | Inventor | Beverly E. Williams<br>LaGrange Park, Ill. |
|---|---|---|
| [21] | Appl. No. | 660,625 |
| [22] | Filed | Aug. 15, 1967 |
| [45] | Patented | Jan. 5, 1971 |
| [73] | Assignee | a fractional part intered<br>Kathryn I. Williams<br>LaGrange Park, Ill. |

[54] APPARATUS FOR AGING AND FLAVORING MEAT
11 Claims, 3 Drawing Figs.

[52] U.S. Cl. ................................................. 99/271, 62/157
[51] Int. Cl. ..................................................... A47j 47/06
[50] Field of Search ........................................... 99/234, 269, 271, 107, 100, 218; 165/12; 62/264, 157; 98/52, 54; 99/194

[56] References Cited
UNITED STATES PATENTS

| 2,251,617 | 8/1941 | Pirnie ............................ | 99/271 |
| 2,315,285 | 3/1943 | Dennington ................... | 62/157X |
| 2,342,998 | 2/1944 | Bieret ............................ | 99/271 |
| 2,419,119 | 4/1947 | Christensen .................. | 99/271X |
| 2,816,836 | 12/1957 | Williams ........................ | 99/107 |
| 3,377,941 | 4/1968 | Jaremus ........................ | 99/271 |

*Primary Examiner*—Robert W. Jenkins
*Attorney*—Cameron, Kerkam & Sutton

ABSTRACT: A controlled area is provided within which meat is stored for a period of one to four days at a controlled temperature of 65° F. to 75° F. in the presence of Thamnidium. Access to the area is avoided while the aging process is taking place and after the aging process is completed, bacterial development in the area and on the meat is inhibited by the energization of germicidal lamps. In the aging process, activity of the mold spores of Thamnidium is stimulated by atomizing liquid Thamnidium into the treatment area. Air, oxygen, Freon gas or other suitable gas may be utilized as the propellent.

PATENTED JAN 5 1971

INVENTOR
BEVERLY E. WILLIAMS

BY
*Cameron, Kerkam & Sutton*
ATTORNEYS

INVENTOR
BEVERLY E. WILLIAMS
BY
Cameron, Kerkam + Sutton
ATTORNEYS

APPARATUS FOR AGING AND FLAVORING MEAT

In the normal aging process of beef, beef is separated into its various cuts and hung or otherwise stored in a refrigerated space for a time sufficient to permit the natural enzymes to carry out the tendering process. By controlling the temperature conditions during the aging process to avoid excessive decomposition and bacterial growth as, for example, by storing the meat in a refrigerated space in which the aging is carried out, it is possible to retard the activity of harmful bacteria, such as acromobacter, for example, more than the activity of the natural enzymes in the meat. This process will produce well-aged meat but requires 2 to 4 weeks.

Under ideal conditions, the refrigerated space is maintained at a temperature of about 34° F. to hold down bacterial growth and at a relative humidity of about 80 percent to hold down mold growth. Under these conditions, the rate of aging is also held down so that an average of 21 days is required to achieve the desired tendering effect. These conditions are not difficult to meet; however, it is undesirable to operate a process under these conditions because of the amount of space required for aging the meat and the large inventory of meat in storage, particularly in a commercial establishment such as a restaurant or hotel.

If the temperature used in the aging process is increased for purposes of accelerating the activity of the enzymes for tendering the beef, the bacteria also become more active. Thus, spoilage of the meat, slime and putrefaction with consequent loss and mold growth is also accelerated to such an extend that appreciable losses are incurred by reason of the trimming necessary to remove the spoiled, decomposed or molded parts. On the other hand, if the humidity in the refrigerated space is kept low to retard mold growth, very often the surface portions of the beef become desiccated and discolored with consequent loss by shrinkage and with further loss from the trim required to be cut off the desiccated and discolored parts.

Various meat aging and tenderizing processes have been developed which drastically reduce the aging time required and impart an aged, walnutlike flavor to the meat. For example, in my U.S. Pat. No. 2,816,836 of Dec. 17, 1957, I have described methods for aging and tenderizing beef under specified conditions of temperature and humidity. As disclosed in my U.S. Pat. No. 2,816,836, Thamnidium may be introduced into the space where the meat is being aged to minimize bacterial growth and sliming. A black walnut taste is imparted to the meat that is characteristic of carefully and properly aged meat. However, it is important that the meat retain a good appearance without loss of brightness of color.

In commercial establishments, maximum use of storage apparatus must be made as a matter of economic necessity. However, if a storage unit or room is loaded to capacity and thereafter Thamnidium spores sprayed into the unit or area, the aging process does not proceed properly. I have discovered that this occurs because, in a fully loaded storage unit, the meat absorbs oxygen necessary to the aging process. The meat stays red so long as oxygen is available in the storage unit; however, when the oxygen supply is depleted, the meat becomes first tan, then brown and then quite dark or purplish. The oxidizing of the meat also deprives the Thamnidium of the necessary oxygen to keep the spores viable, thereby stopping the aging process and preventing the development of the characteristic Thamnidium or black walnut flavor. Accordingly, it is apparent that conventional refrigeration rooms cannot be utilized for aging meat with Thamnidium without a consequent loss of a major portion of available storage space.

These and other disadvantages are overcome by the present invention which has its primary object to provide improved apparatus for aging and flavoring meat.

To this end, in accordance with the present invention, a temperature-controlled area is provided for aging meat wherein the area, room or unit can be loaded to maximum capacity. The area is maintained between approximately 65° F. to 75° F. to increase activity of the enzymes. Thamnidium is introduced into the atmosphere within the controlled area and the aging process allowed to take place for a period of 1 to 4 days.

The relative humidity of the area, when loaded with meat, approaches 100 percent.

In accordance with one feature of the present invention, means for providing and circulating makeup air to the control area are provided to compensate for oxygen absorbed by the meat.

In accordance with another feature of the present invention, oxygen is added to the interior of the control area to stimulate activity of the mold spores of Thamnidium and maintain the cut red meat surfaces, which normally have a tendency to darken at the relatively warm temperatures of 65° F.—75° F., light and bright red.

In accordance with a third feature of the present invention, the liquid Thamnidium is atomized into the control area by a manually operated apparatus, a propellent or by compressed gas at the start of the process.

Other objects and advantages of the invention will become more apparent from the following description taken in connection with the accompanying drawings which depict a cabinet-size unit, wherein like reference characters are employed to designate like parts. A larger area, such as a walk-in room would be essentially similar.

Figure 1:
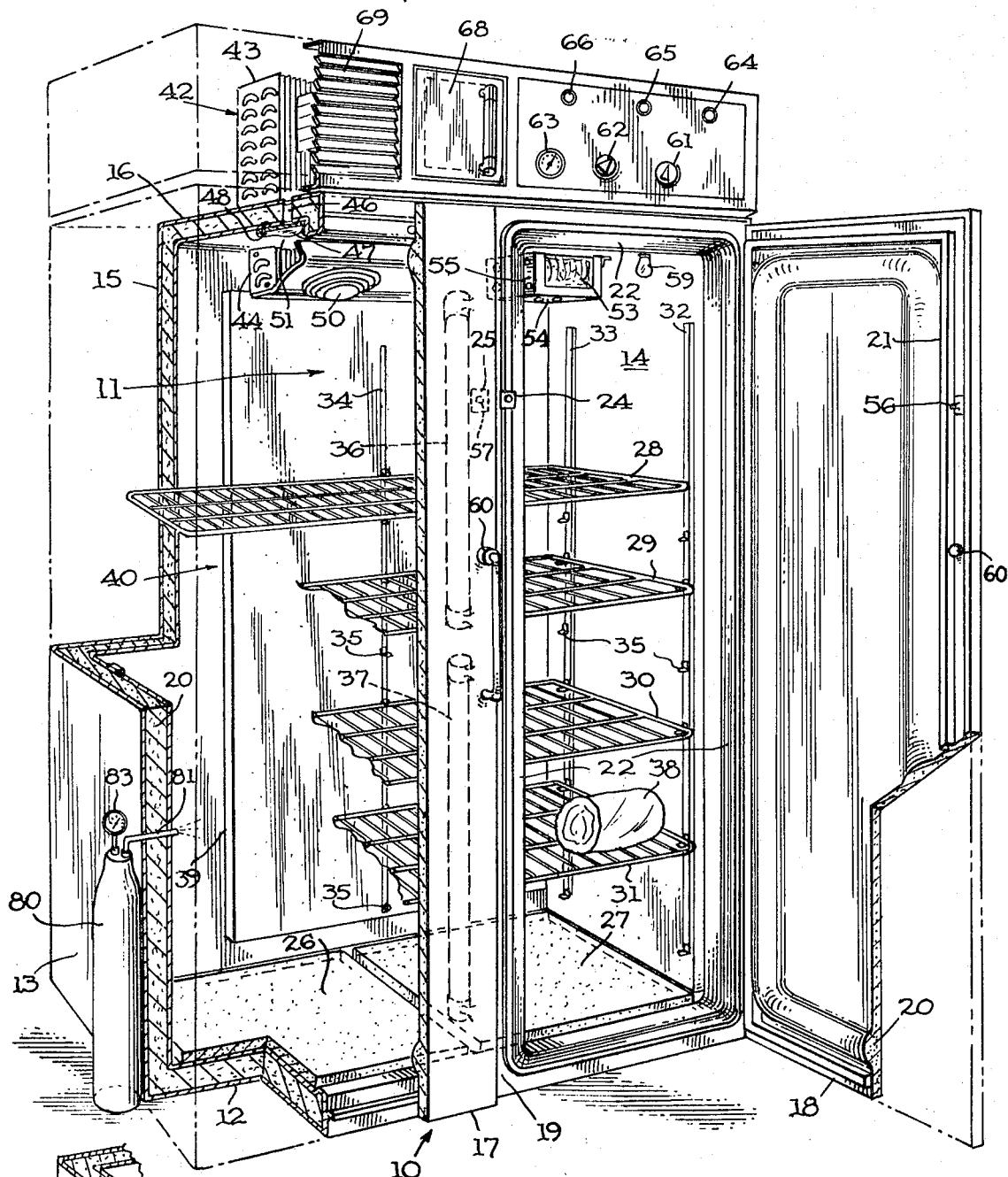
FIG. 1 is cabinet-type partial perspective view, partially in cross section, illustrating a cabinet-type apparatus of the present invention.

Referring to FIG. 1, reference character 10 generally designates a refrigerated meat storage apparatus of the present invention which provides a substantially airtight storage area 11. Although the apparatus may take the form of a room or reach-in storage unit of any suitable shape, it is shown, for purposes of illustration, in the form of a cabinet comprising a base 12, sidewalls 13 and 14, rear wall 15, top wall 16 and a pair of hinge supported door members 17 and 18 which close.

As should be readily apparent, the general arrangement of the inside of the storage apparatus, the number of doors, the placement of the doors and the size of the storage area or compartment may be varied according to the particular application of the unit. Preferably, the storage apparatus is fabricated from a heavy gauge, corrosion resistant metal or may be finished in a baked enamel or bonderized in a conventional manner. All walls and doors are double-wall construction and insulated with a lightweight vermin and moisture-proof insulation 20 such as foam plastic. The interior of each of the doors 17 and 18 include a vinyl plastic, magnetic door gasket 21 to insure a positive airtight seal when the gasket bears against surfaces 22 of the unit exposed within the antisweat cables 23 having conveniently located control switches 24 and 25.

In a cabinet, for example, the floor of the storage area may be recessed and is provided with mats or cellulosic pads 26 and 27 which serve to sold and dispense Thamnidium and, in addition, catch drips. While it may be advantageous in some installations to utilize drip pans on the floors to catch the drip blood, fat, juices, etc. in most situations, I have found it more effective to have the drip absorbed by the cellulosic pads. To this end, when the thamnidium mist is atomized into the area 11, it gradually settles to the floor where it is held by the pads 26 and 27 and subsequently evaporated into the air within the cabinet. The cellulosic pads do this more effectively than a drip pan, because in the drip pan the Thamnidium mixes in the liquid state with the liquid blood, juices and other drips and thus renders the Thamnidium less effective.

Meat is stored within the cabinet storage area 11 on a plurality of wire shelves 28—31 which are in turn supported at opposite sidewalls on vertically disposed support racks 32 and 33. One or more support racks 34 may also be provided at the rear of the cabinet if desired to support the shelves along their length. Each of the racks include a plurality of spaced supports 35 upon which the shelves are supported so as to permit adjustment of the spacing between the shelves in a conventional manner.

When utilizing a two-door cabinet, it is desirable to mount on the center post 19 a pair of germicidal lamps 36 and 37, preferably ultraviolet lights of 2,537 Angstrom units. The lamps are supported on the inside of the center post and provided with shields (not shown) to protect the eyes of the operator and to direct and distribute the light more effectively over the entire storage area. The lamps are electrically connected to a control circuit so as to be energized only when the aging process is over and the doors are unlocked or open. The germicidal lamps serve to inhibit bacterial development both in the air and on the meat, one piece of which is represented by a cut 38. The ultraviolet lights also emit a small amount of ozone which helps to freshen the air of the cabinet or controlled zone.

Supported to rear wall 15 is a liner 39 so that there is formed between one side of the liner and the rear wall a duct 40 in which a calrod heater 41 is mounted. The refrigeration unit 42 is mounted to the top wall 16 and includes a hermetically sealed condensing unit 43 having a forced air fan-type condenser fully charged with freon. Evaporator coils 44 are mounted inside storage area 11 and to the top wall 16. The condenser is supplied with conventional 115 volt, 60 cycles, single phase power and a conventional thermostat control 45 is provided to maintain the temperature within the limits of 65° F. to 75° F.

Also mounted to the top wall 16 is an air-circulating unit comprising one or more circulating fans 50 and air directing duct 51. Associated with duct 51 is a tray 52 which receives a pad or cellulosic sponge 53 adapted to be impregnated with liquid Thamnidium. The tray has its base 54 and sidewalls 55 perforated to facilitate air flow therethrough and is disposed adjacent one open end of duct 51. If desired, an additional tray (not shown) may be disposed adjacent the other end of duct 51. Alternatively, the tray may be positioned directly beneath the air circulating fan 50.

In operation, the sponge 53 is impregnated with liquid Thamnidium and when the fans are energized, air is drawn through the perforated walls of the tray and sponge so as to cause the Thamnidium to be evaporated and distributed through the ducts 51 and 40 into the air within the compartment. This arrangement is particularly advantageous where manually operated spray-type liquid Thamnidium guns are used to spray air into the cabinet and on the meat, since such guns always have a liquid residue which is not sprayed into the air. The liquid residue often represents approximately 20 to 25 percent of the total liquid contents of the spray can. This residue may be poured onto the sponge 53 after the spray head is removed from the gun and thereby the entire contents are utilized without wastage.

Figure 2:
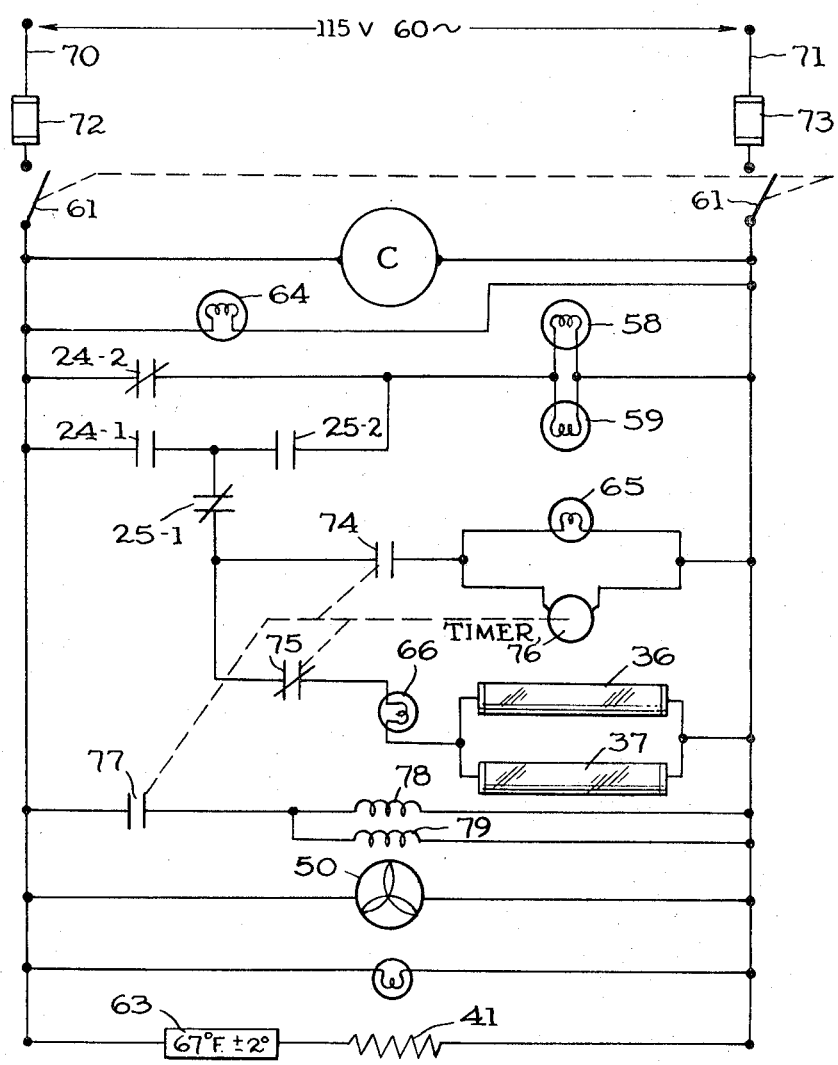
FIG. 2 is an across-the-line electrical wiring diagram of the present invention.

Associated with each control switch 24 and 25 and conveniently arranged on each door 17 and 18 is a switch operating member 56 and 57. The make and break contacts of the switches 24 and 25 are electrically connected to remove power from the germicidal lamps 36 and 37 and prevent energization of the timer control when the corresponding doors are open. As shown in FIG. 2, each switch includes a pair of normally closed (door closed) contacts 24–1 and 25–1 and a pair of normally open (door closed) contacts 24–2 and 25–2 which have their positions reversed when the door is open. The contacts are illustrated to correspond to the condition of the doors shown in FIG. 1 where door 18 is open and door 17 is closed so that contacts 24–2 electrically connect a pair of electrical incandescent lamps 58 and 59 mounted within the storage area to the power source.

In order to lock the cabinet after the aging process has begun, each door has provided thereon a lock 60. Since access to the cabinet should be avoided during the aging process, the lock is preferably of the electromagnetic type and arranged to be automatically operated from the timer circuit of the apparatus. In this manner, the doors are automatically maintained closed while aging process is in operation and automatically opened upon termination of the aging process.

In lieu of an automated locking device, a light or signal might be utilized, operated by the timer circuit.

The controls for the storage apparatus 10 are housed within a control panel located on the outside at the top front of the cabinet or adjacent the door of the storage area. The external controls include on/off switch 61, timer dial 62, thermostat dial and temperature gauge 63. Three multicolor indicator lights 64, 65 and 66 give a visual indication of the condition of the unit. Indicator 64 may be a white light and is energized when switch 61 is closed and the power applied to the unit compressor C. Indicator 65 may be red and is energized while the timer motor is in operation during the aging process, while indicator 66 may be green and is energized when the aging process has been terminated.

Disposed adjacent the control panel is a secondary storage unit to which access may be had through door 68. The storage unit provides a convenient place for placement of the spray-type Thamnidium guns. The remainder of the top of the cabinet may be louvered as at 69.

Referring to FIG. 2, there is illustrated the electrical wiring diagram of the control circuit for the storage apparatus 10. One hundred fifteen volt, 60 cycle power is applied across lines 70 and 71 through fuses 72 and 73 and applied to the compressor C when the on/off switch 61 is closed. If contacts 24–1 and 25–1 of both doors 17 and 18 are closed, power is applied through switches 24 and 25 to one side of normally open contacts 74 and also one side of normally closed contacts 75 to energize lamp 66 and germicidal lamps 36 and 37. Contacts 74 and 75 are a conventional set of cam actuated contacts operated from a cam (not shown) driven by timer motor 76. When the timer motor is set for the desired aging cycle, contacts 74 are closed and contacts 75 are opened, thereby removing power from the germicidal lamps 36 and 37 and energizing timer motor 76. Shortly after the timer motor is energized, another pair of cam driven switch contacts 77 are actuated to energize the coils 78 and 79 for magnetic locks 60. The fan 50 is always energized so long as the refrigerator unit is in operation while the calrod heater 41 is intermittently connected across the line by operation of thermostat 63. Thermostat 63 is selected to maintain the internal temperature of the storage area 11 at 67° F. plus or minus 2°. The timer motor is normally deenergized, but enabled for energization upon closure of contacts 24–1 and 25–1. A time period selected by turning of timer dial 62 closes contacts 74 to complete the circuit to the timer motor, provided both doors are closed.

When the timer is energized, contacts 77 close to energize the coils of the magnetic locks 60 to insure that the cabinet is not open until the aging process is complete. A manual door lock may also be utilized, if desired. Upon runout of the timer, contacts 77 open to remove power from the magnetic lock. Simultaneously at the start of the aging process, contacts 75 open so that the germicidal lamps 36 and 37 are not energized during the aging process. The deenergization of the ultraviolet lamps during the aging process is important. If the ultraviolet is directed onto the meat, the light tends to sunburn or discolor the meat due to change of the hemoglobin from an oxy-hemoglobin to a met-hemoglobin.

In the introduction of Thamnidium, the specific amount of Thamnidium introduced into the atmosphere in the control area for aging of the meat is not critical, because the Thamnidium spores propagate rapidly when they collect on the surface of the meat under the conditions described. However, because the time period is short, generally 1 or 2 days and not over 4 days, a liquid suspension of Thamnidium is preferred containing 250,000 viable spores per ml. (milliliter). Additionally, in order to stimulate the immediate propogation and development of the spores, the Thamnidium suspension may be buffered to optimum pH with acetic acid, sodium acetate, butylated isophltallate, edible antioxidants, ethyl and methyl isoascorbates or other approved and acceptable chemicals.

Around 250,000 spores of Safourand Agar cultured Thamnidium per ml. of aqueous suspension has been found adequate to provide approximately 20,000 spores for each 1 square inch of red meat surface available to the Thamnidium within the controlled meat aging zone. The Thamnidium present on the surface of the meat has been found effective to hold down bacteria growth by the process of eating up the bacteria in the air or on the surface of the meat by depriving the bacteria of some of the elements necessary for growth.

In operation, when the area is loaded with meat, the temperature within the unit is maintained approximately 65° to 75° F., and preferably at a relatively constant temperature of 67° F. The humidity is maintained at 90/100 percent. The timer is set for 1 to 4 days and the storage area 11 locked to prevent access thereto until the aging cycle is complete. Thamnidium is sprayed into the control area and on the meat and the aging process allowed to continue. One day in the atmosphere of the control area, in the presence of Thamnidium and at a temperature of approximately 65° to 75° F. with high relative humidity and a moderate air movement or circulation and a supply of makeup air equivalent to approximately one complete air change every 24 hours, is equivalent to aging beef an entire week in a good aging cooler where the temperature is maintained at 35° to 45° F. without the presence of Thamnidium.

As previously mentioned, it has been found that when a conventional refrigerated aging cabinet is loaded to full capacity, the aging process does not proceed adequately because the limited supply of oxygen available within the control area is rapidly absorbed by the oxidation of the meat and the Thamnidium is deprived of the necessary gas to stimulate the spores. To obviate this difficulty, I have provided means to introduce makeup air into the cabinet. To this end, one or more openings 46 are provided in the top wall 16 of the cabinet immediately above the interior fan 50 so that operation of the fan will draw in outside air. The opening is approximately one-half to 1 inch in diameter. A movable cover 47 is associated with each opening and pivotally supported to the top wall by pivot pin 48 to allow for opening or closing, thus increasing or decreasing the amount of makeup air commensurate with the needs or requirements of the meat. The cover advantageously should include a gasket for cooperation with the top wall to maintain the airtight integrity of the storage area 11. The size of the opening is determined by the size of the storage area. For a 47 cubic foot capacity, a hole of approximately 1 inch in diameter positioned directly above the fan permits the fan to draw in approximately 2 cubic feet of air per hour. This gives a complete air change every 24 hours. For a larger room, a larger opening or multiple opening may be desired, along with the regular circulating fan or a special air induction fan.

Another method of stimulating more spores of Thamnidium within the storage area is to increase the available oxygen supply. This may be effected by adding oxygen or an oxygen combination gas directly into the storage area 11. To this end, a cylinder 80 of compressed oxygen is disposed adjacent sidewall 13. Tubing 81 extends into the storage area 11 and is connected to a valve outlet 82 provided on cylinder 80. Indicator 83 is provided to measure the amount of oxygen within the cylinder. The valve 82 may be opened at selected intervals to release a supply of oxygen into the storage area 11. In addition to stimulating the activity of the mold spores of Thamnidium, the oxygen also has a lightening and brightening effect upon the cut red meat surfaces.

In accordance with another embodiment of the invention, rather than injecting oxygen into the storage area manually, the cylinder valve 82 may be of the electrically operated type and automatically operated through an additional set of cam operated contacts provided on the timer. The contacts are momentarily actuated to cause the coil of the electromagnetic valve to be energized momentarily and permit oxygen to be injected under control of the timer motor 76.

Figure 3:
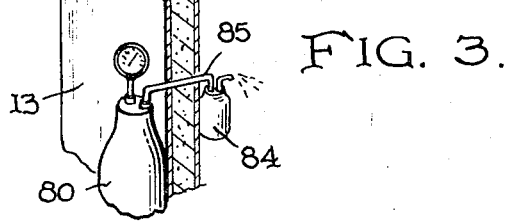
FIG. 3 is a partial elevational view showing an alternative embodiment of the invention.

The latter arrangement lends itself conveniently to another embodiment of the invention wherein compressed gas is utilized to atomize liquid Thamnidium into the control area within the cabinet after the meat has been placed in the cabinet and the doors closed or locked. To this end, as shown in FIG. 3, a liquid Thamnidium atomizing container 84 is supported within the storage area and connected to tubing 85 and compressed gas cylinder 80. The gas is released from the cylinder either through manual operation of valve 82 or the automatic operation of an electromagnetic valve under control of the timer to atomize the liquid Thamnidium suspension into the control area. Of course, it should be readily apparent that the cylinder 80 and container 84 need not be mounted to the side of the cabinet as shown, but that they can be disposed in any convenient location where ready access is provided for replacement when the contents have been expended. To this end, the cylinder 80 may be supported adjacent the condensing unit 43 with the supply connections from the cylinder brought in through the top wall 76. In an alternative construction, base 12 may include leg members which raise it above ground level and the cylinder may be mounted beneath the cabinet. Also, the supply from the gas cylinder may enter the controlled area of the cabinet or room at several locations to insure its adequate circulation.

While the invention has been described in connection with certain specific embodiments thereof, it is to be understood that this is by way of illustration and not by way of limitation and it is intended by the appended claims to cover all modifications which fall within the true scope of the invention.

I claim:

1. Apparatus for aging and flavoring meat comprising in combination an enclosed, refrigerated control area providing a meat storage zone, control means including a timer adapted to be programmed for controlling the aging process for a period of 1 to 4 days, thermostatic control means for maintaining the temperature in said control area within predetermined limits of approximately 65° F. to 75° F., at least one germicidal lamp within said control area, first switch means operable by said timer for preventing energization of said germicidal lamp during the aging process, lock or signal means for avoiding access to the control area during the period of aging process, second switch means operable by said timer for operating a lock means, means for circulating the atmosphere within the control area, a source of Thamnidium within said control area and means for stimulating the activity of the Thamnidium within said control area, said means for stimulating the activity of the Thamnidium including a normally closed valve connected between said control area and a source of gas adapted upon opening to supply to said control area a quantity of the gas to compensate for oxygen absorbed by the meat in the storage area during the aging period.

2. Apparatus for aging and flavoring meat as set forth in claim 1, wherein said source of gas is a cylinder of compressed gas.

3. Apparatus for aging and flavoring meat as set forth in claim 1, wherein said source of gas is a cylinder of oxygen.

4. Apparatus for aging and flavoring meat as set forth in claim 1, wherein said valve comprises a channel connecting the enclosed control area to the atmosphere and a normally closed cover member sealing said channel, said cover being pivotally mounted to regulate the opening of said channel and control the amount of air introduced into the enclosed area from the atmosphere.

5. Apparatus for aging and flavoring meat as set forth in claim 1, wherein said source of Thamnidium within said control area comprises Thamnidium in liquid suspension and further including conduit means connecting said source of gas to said liquid suspension, said source of gas being compressed gas such that said valve means upon opening causes the liquid suspension of Thamnidium to be atomized into the control area.

6. A refrigerated meat storage unit for aging and flavoring meat comprising in combination a base, top, side and back walls, and at least one door for providing an enclosed meat storage zone, a door lock or signal means for preventing or discouraging access to the control area during the period of the aging process, a control panel for operating the unit and controlling the aging requirements, including a source of power, thermostatic control means connected to said source of power and arranged for maintaining the temperature in said storage zone within predetermined limits of 65° F. to 75° F., a timer control including a timer motor adapted to be connected to said source of power and programmed for setting the aging process for a period of 1 to 4 days and a plurality of switches actuated by said timer motor, a first of said switches being serially connected to said motor so as to cause said motor to be energized upon initiation of the timing period, said first switch adapted to be actuated by said motor upon completion of the said period to disconnect the timer motor from the source, a second of said switches being serially connected with said lock actuating means for energizing the actuating means to thereby lock said door to prevent entrance during the aging process, a germicidal lamp mounted within the storage unit, a third of said switches being serially connected to said germicidal lamp to cause said lamp to be energized when the aging process is complete, door actuated switch means for electrically connecting said first switch means and said third switch means when said door is closed to said source of power and adapted to disconnect said first and said third switch means from said source of power when said door is opened, means within said storage unit for dispensing Thamnidium in said storage zone and a motor driven fan for circulating the atmosphere within the storage zone.

7. A refrigerated meat storage unit as set forth in claim 6, wherein said means for dispensing Thamnidium comprises at least one cellulosic pad disposed on said base.

8. A refrigerated unit as set forth in claim 6, wherein said means for dispensing Thamnidium comprises at least one tray supported adjacent said fan, said tray having cellulosic sponges adapted to be impregnated with a liquid suspension of Thamnidium.

9. A refrigerated meat storage unit as set forth in claim 6, wherein said means for dispensing Thamnidium comprises a container having a liquid Thamnidium suspension, and further includes a source of compressed gas supported exterior to one of said walls, tubing means connecting said source of compressed gas to said container and normally closed valve means connected to said tubing for atomizing the liquid Thamnidium suspension into the storage zone upon opening thereof.

10. A refrigerated meat storage unit as set forth in claim 9, further including at least one cellulosic pad disposed on said base.

11. A refrigerated meat storage unit as set forth in claim 10, wherein said compressed gas is oxygen.